March 6, 1928.

A. PERON 1,661,299

MACHINE FOR GRADING GROUND COFFEE

Filed Oct. 23, 1924

INVENTOR
Anthony Peron
BY
ATTORNEY

March 6, 1928. 1,661,299
A. PERON
MACHINE FOR GRADING GROUND COFFEE
Filed Oct. 23, 1924 2 Sheets-Sheet 2
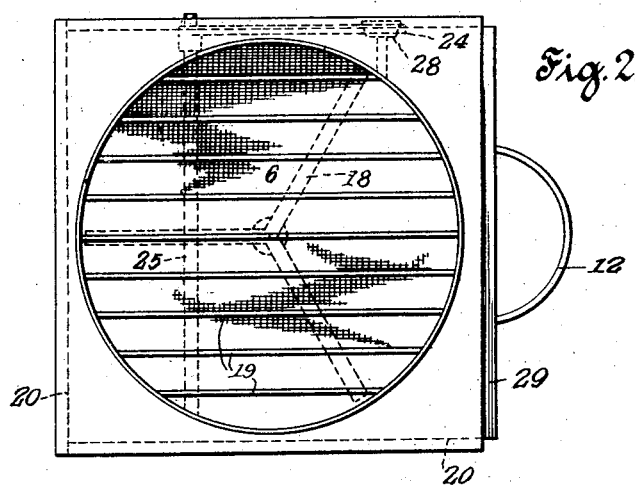
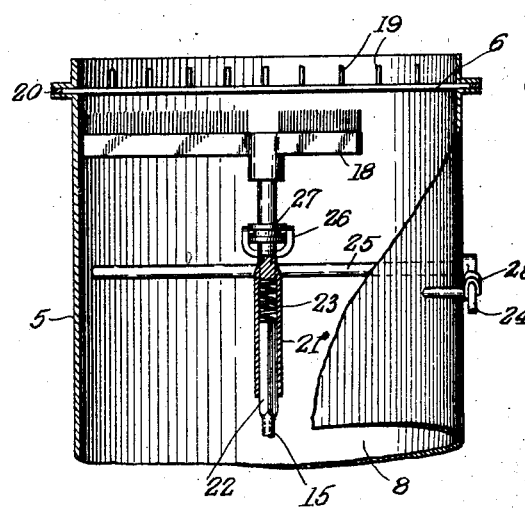
INVENTOR
Anthony Peron
BY
Philip S. McLean. ATTORNEY Patented Mar. 6, 1928.

1,661,299

UNITED STATES PATENT OFFICE.

ANTHONY PERON, OF NEW YORK, N. Y.

MACHINE FOR GRADING GROUND COFFEE.

Application filed October 23, 1924. Serial No. 745,287.

When the coffee bean is pulverized or ground quite fine, an appreciable quantity of very fine powder is produced which is considered objectionable by some because of the cloudy or "muddy" appearance it imparts to the coffee.

The main objects of this invention are to provide simple and practical apparatus for quickly and effectively removing the powder from the ground coffee.

Other objects as well as the novel features of construction, combination and relation of parts by which the desired results are attained will appear as the specification proceeds.

In the drawings accompanying and forming part of this specification, the invention is illustrated embodied in a simple, practical form, but it should be understood that the structure may be varied without departure from the broad spirit and scope of the invention as hereinafter defined and claimed.

Figure 2 is an enlarged sectional view of the apparatus on substantially the plane of line 2—2 of Figure 1.

Figure 3 is a broken sectional view of the mechanism for withdrawing the rotary screen brush.

Figure 4 is a broken horizontal sectional view on substantially the plane of line 4—4 of Figure 1.

Figure 1:
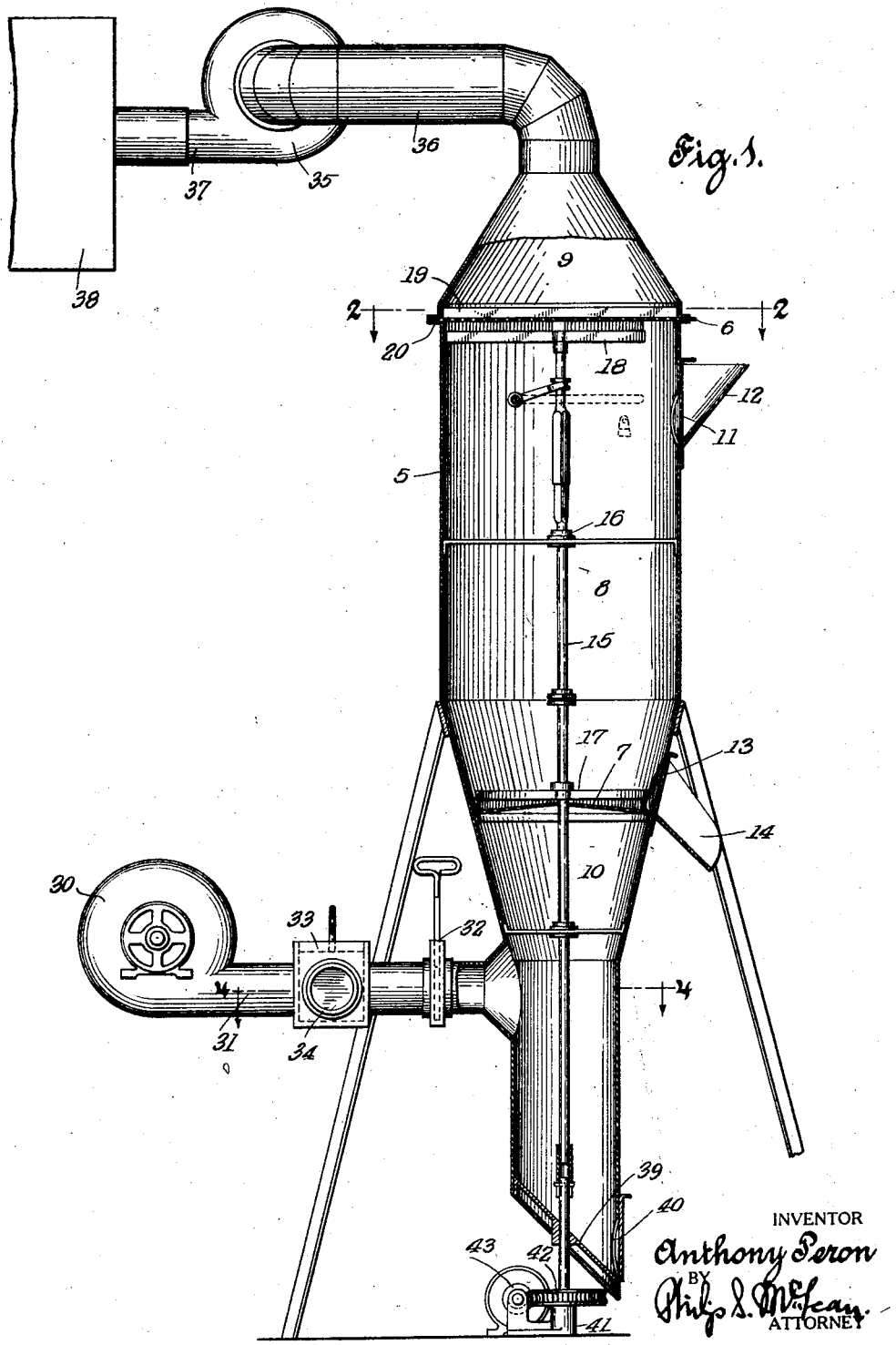
Figure 1 is a part sectional side elevation of the complete apparatus.

The body of the apparatus is illustrated in the form of a vertical casing 5 divided by upper and lower screens 6 and 7 into an intermediate receiving chamber 8 with a conical exhaust chamber 9 above the upper screen and a conical pressure chamber 10 below the lower screen.

The intermediate chamber has a sliding or other close fitting gate 11 in the upper portion of the same through which the coffee is introduced surrounded by a funnel wall 12 providing a charging chute. At the bottom of this chamber, substantially in line with the lower screen is a tight fitting discharge gate 13 opening to a discharge chute 14.

A shaft 15 is shown supported in bearings 16 substantially at the center of the casing and carrying a radial armed brush 17 riding over the lower screen and another radial armed brush 18 engaging the under face of the upper screen. The lower screen is shown as of slightly conical formation so that when the discharge door is opened, the brush arms will operate to sweep the contents out through the discharge opening. This conical formation braces the screen against the pressure of the brush and the upper screen which is shown as substantially flat, is shown as braced by bars 19 extending transversely across the top of the same. This upper screen also is shown as slidably supported in a guideway 20 which is open at the front of the machine so that said screen can be withdrawn for cleaning purposes or for the substitution of screens of different mesh.

Prior to withdrawing the upper screen the brush is preferably retracted from engagement therewith as by means of a construction such as shown in detail in Figure 3, and comprising an angular sleeve 21 at the back of the upper brush head fitting over an angular portion 22 on the upper end of the brush shaft with a spring 23 interposed in the telescopic joint thus provided to press yieldingly up against the screen and also to enable a retractive movement of the brush head. This movement is effected in the illustration by a hand lever 24 on one end of a rock shaft 25 which carries a fork 26 with lugs operating in a groove in the collar 27 on the axial portion of the brush head. A hook 28 is shown provided on the outside of the casing which can be engaged by the hand lever to hold said lever down with the brush retracted from engagement with the screen. The screen may be equipped with a suitable handle 29 as shown in Figure 2, to enable its ready removal from the guide 20 in which it is slidably supported.

To provide the pressure below the lower screen, a blower is shown at 30 connected by a conduit 31 to the pressure chamber 10. A gate valve 32 is shown interposed in this conduit and a relief valve 33 is shown provided in a branch 34 led off from one side of the pressure conduit.

The suction for the exhaust chamber is provided in the illustration by a suction blower 35 connected by conduit 36 with the exhaust chamber in the top of the casing and the pressure side of this suction fan is shown connected by conduit 37 with a separator 38 which may be of any general or special construction suited to the work of catching and holding the finer particles or powder which has been passed up through the screen.

The bottom of the casing is shown sloped to the front as at 39 and a discharge gate 40 is provided at the lowest point for discharge of the heavier material collected in the lower chamber.

The central brush shaft is shown as extended down through the bottom of the casing and supported in a step bearing 41 and is further shown as carrying a worm gear 42 by which it is driven at relatively slow speed from a worm 43.

In operation, the coffee ground to the proper degree of fineness is charged into the separating chamber and with the suction and pressure creating devices in operation, the blast up through the lower screen will lift and separate the material, forcing the fine powder up through the upper screen, from which it is positively carried off by the exhaust fan. The exhaust draught thus supplements and aids the compressed air in separating and carrying off the pulverized material and clogging of the fine mesh screen by this oily powder is prevented by the brush which is constantly sweeping across the face of the screen.

The havier granular material falls through the coarser lower screen into the lower compartment and the over-size product is retained in the separating chamber. When the machine has been operated for a sufficient period to remove practically all the powder, the exhaust fan and blower may be shut off or disconnected so as to permit the properly graded material to settle in the lower compartment from which it can be removed at the door 40 and the over-size material can be then taken out at the door 13. During removal of such material the brush 17 may continue in operation so as to sweep the material off the conical screen into the discharge chute 14.

The brush 18 prevents clogging of the fine mesh screen but this screen may be removed at any time and cleaned with air pressure by holding it over the end of the branch pipe 34. This involves simply pulling down on the lever 24 to retract the upper brush, sliding out the screen and then holding the screen over the end of the blow pipe 34, the valve 33 being then either wholly or partly opened and the through valve 32 being ordinarily closed so as to obtain the full effect of the blower.

The ground coffee has an oily quality, tending to cause it to adhere and accumulate as a pasty mass against the screen, but the compressed air and brush overcome such tendencies and prevent the screen from becoming clogged.

What is claimed is:

1. Apparatus for treating ground coffee, comprising a casing divided by upper and lower screens into a compartment for introduction of the ground coffee, air blast means introduced into the case beneath the lower screen, suction means connected with the top of the casing above the upper screen, a separator connected with said suction means and an outlet to the air blast compartment below the lower screen for removing material passing through the lower screen into said compartment.

2. Apparatus for treating ground coffee, comprising a casing divided by upper and lower screens into a compartment for introduction of the ground coffee, air blast means introduced into the case beneath the lower screen, suction means connected with the top of the casing above the upper screen and valve means for diverting the blast.

3. Apparatus for treating ground coffee, comprising a casing divided by upper and lower screens into a compartment for introduction of the ground coffee, air blast means introduced into the case beneath the lower screen, suction means connected with the top of the casing above the upper screen and valve means for diverting the blast, one of the screens being readily removable from the casing for placement in front of the diverted blast.

4. Apparatus for treating ground coffee, comprising a casing divided by upper and lower screens into a compartment for introduction of the ground coffee, air blast means introduced into the case beneath the lower screen, suction means connected with the top of the casing above the upper screen and rotating brushes within the coffee containing compartment for cleaning the upper and lower screens.

5. Apparatus of the character disclosed, comprising a casing having an intermediate compartment defined by upper and lower screens, the upper being of finer mesh than the lower and the lower defining a collection chamber in the bottom of the casing, an air blower having a discharge conduit opening into the collection chamber and a suction device having a suction conduit opening into the top of the casing above the fine screen.

6. Apparatus of the character disclosed, comprising a casing having an intermediate compartment defined by upper and lower screens, the upper being of finer mesh than the lower and the lower defining a collection chamber in the bottom of the casing, an air blower having a discharge conduit opening into the collection chamber, a suction device having a suction conduit opening into the top of the casing above the fine screen, an upright shaft in the casing and brushes on said shaft cooperating with the screens.

7. Apparatus of the character disclosed, comprising a casing having an intermediate compartment defined by upper and lower screens, the upper being of finer mesh than the lower and the lower defining a collection chamber in the bottom of the casing, an air blower having a discharge conduit opening into the collection chamber, a suction device having a suction conduit opening into the top of the casing above the fine screen, the pressure conduit having a valved discharge outside the collection chamber and a valve in the pressure conduit for closing off communication with the collection chamber.

8. Apparatus for removing the powdered particles from ground coffee, comprising a casing with powder removing and graduated coffee collecting chambers and an intermediate separating chamber, said separating chamber having means enabling the introduction of ground coffee therein, a powder separating screen between the separating chamber and powder removing chamber, a coffee grading screen between the separating chamber and collecting chamber, an exhauster connected with the powder removing chamber for carrying off the powder passing through the powder screen, means for subjecting the ground coffee in the separating chamber to the action of an air blast to thereby facilitate separation of the powder therefrom, the collection chamber having means for enabling removal of the graduated coffee therefrom and the separating chamber having means enabling the removal of the oversize particles left after separation of the powder and graduated coffee therefrom.

9. Apparatus for removing the powdered particles from ground coffee, comprising a casing with powder removing and graduated coffee collecting chambers and an intermediate separating chamber, said separating chamber having means enabling the introduction of ground coffee therein, a powder separating screen between the separating chamber and powder removing chamber, a coffee grading screen between the separating chamber and collecting chamber, an exhauster connected with the powder removing chamber for carrying off the powder passing through the powder screen, means for subjecting the ground coffee in the separating chamber to the action of an air blast to thereby facilitate separation of the powder therefrom, the collection chamber having means for enabling removal of the graduated coffee therefrom, the separating chamber having means enabling the removal of the oversize particles left after separation of the powder and graduated coffee therefrom and means associated with the exhauster for collecting the removed powdered coffee.

In witness whereof, I have hereunto set my hand this 4th day of August, 1924.

ANTHONY PERON.